(12) United States Patent
Williams

(10) Patent No.: US 6,350,079 B1
(45) Date of Patent: Feb. 26, 2002

(54) QUICK COUPLER ASSEMBLY

(75) Inventor: Craig D. Williams, Leicester (GB)

(73) Assignee: Caterpillar S.A.R.L., Geneva (CH)

( * ) Notice: Subject to any disclaimer, the term of this patent is extended or adjusted under 35 U.S.C. 154(b) by 0 days.

(21) Appl. No.: 09/448,928

(22) Filed: Nov. 24, 1999

Related U.S. Application Data

(63) Continuation-in-part of application No. 09/123,679, filed on Jul. 28, 1998, now Pat. No. 6,074,120.

(51) Int. Cl.$^7$ ................................................. B25G 3/18
(52) U.S. Cl. ..................... 403/326; 403/322.1; 403/315; 37/468
(58) Field of Search ................................ 403/326, 321, 403/322.1, 325, 315; 37/468, 403, 409

(56) References Cited

U.S. PATENT DOCUMENTS

| | | | |
|---|---|---|---|
| 5,082,389 A | * 1/1992 | Balemi | 37/468 |
| 5,141,385 A | * 8/1992 | Tibbatts et al. | 414/723 |
| 5,332,353 A | * 7/1994 | Arnold | 37/468 |
| 5,368,409 A | * 11/1994 | Marzulo et al. | 403/324 |
| 5,456,030 A | * 10/1995 | Barone et al. | 37/468 |
| 5,546,683 A | * 8/1996 | Clark | 37/468 |
| 5,549,440 A | * 8/1996 | Cholakon et al. | 37/468 |
| 5,669,668 A | * 9/1997 | Leuchtmann | 403/325 |
| 5,713,691 A | * 2/1998 | Solberg | 403/315 |
| 6,074,120 A | * 6/2000 | Williams | 403/326 |
| 6,154,989 A | * 12/2000 | Kaczmarski et al. | 37/468 |

FOREIGN PATENT DOCUMENTS

GB 2177674 * 7/1985 .................. 37/468

* cited by examiner

Primary Examiner—Lynne H. Browne
Assistant Examiner—Kenn Thompson
(74) Attorney, Agent, or Firm—Diana L. Charlton

(57) ABSTRACT

A quick coupler assembly connects an implement to a work machine. The coupler assembly includes a cylindrical catcher rotatably mounted between a pair of plates. During coupling of the implement with the coupler assembly, the catcher is rotated at a cam surface by an implement coupling pin which allows a latch member mounted to the pair of plates to slidingly engage automatically with the catcher for locking the catcher in a closed position. The closed position of the catcher locates a jaw thereof in a position which retains the implement coupling pin within a receiving notch of the catcher thereby coupling the implement to the work machine. The ability to couple an implement to a work machine with ease and simplicity in conjunction with the utilization of durable components, increases usability and reliability while reducing costs.

10 Claims, 6 Drawing Sheets

Fig_1_

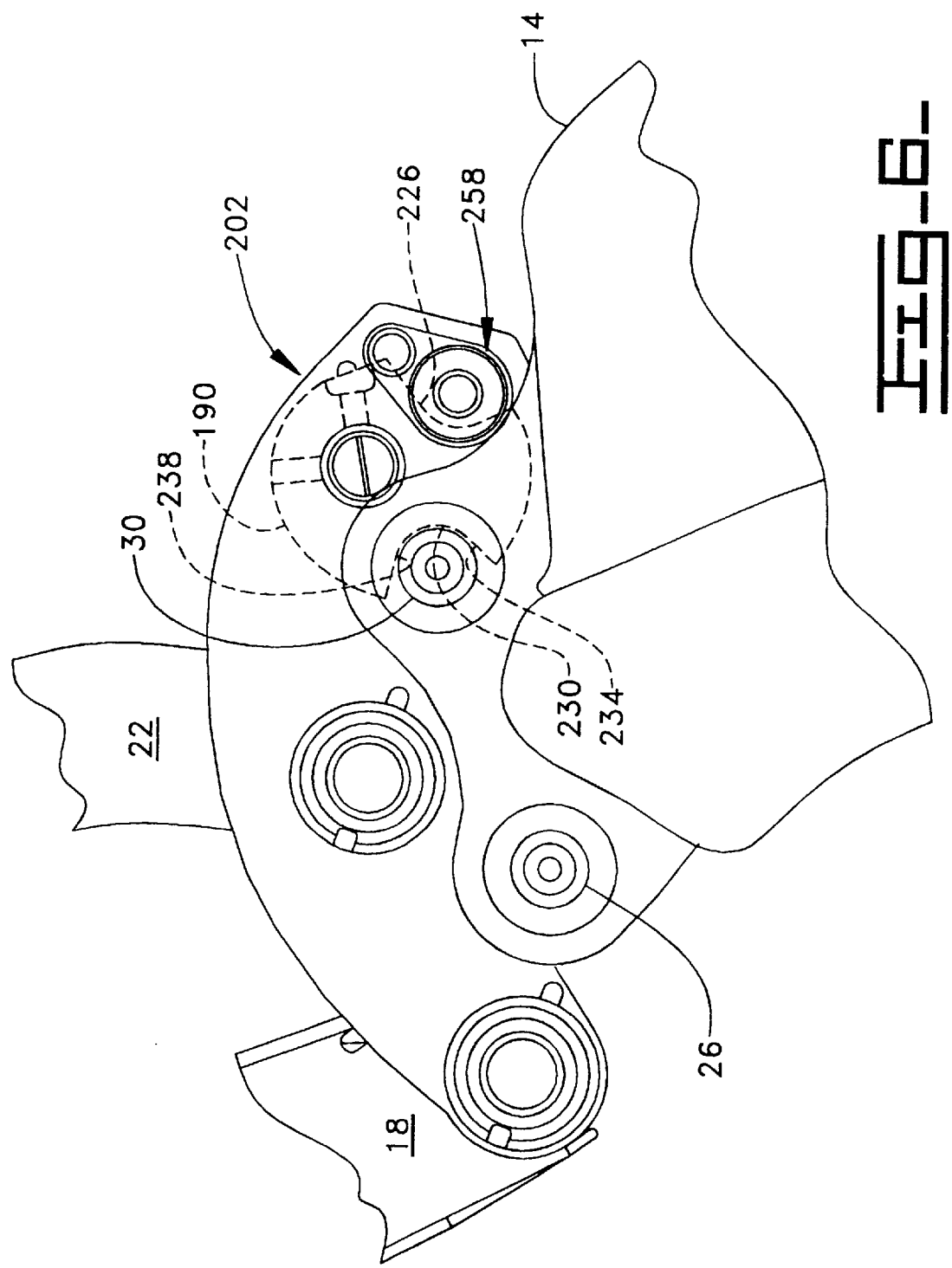
Fig_6

QUICK COUPLER ASSEMBLY

This application is a continuation-in-part of application Ser. No. 09/123,679 filed Jul. 28, 1999 now U.S. Pat. No. 6,074,120.

TECHNICAL FIELD

This invention relates generally to coupler assembly for coupling a work implement to a work machine and more particularly to a coupler assembly which provides quick coupling of the work implement to the work machine through a coupler assembly with a rotating catcher and automatic latching device.

BACKGROUND ART

Current work machines must have the ability to utilize various implements during operation in order to complete a multitude of work tasks. Equipment used to couple the various implements to the work machine should be easy to use so that excessive physical strain on an operator may be virtually eliminated. Furthermore, the coupling equipment must be strong and reliable in order to withstand high forces incurred during operation and designed with fewer parts for a simpler, low cost design.

A design disclosed in U.S. Pat. No. 4,747,612 issued to John B. Kuhn on May 31, 1988 utilizes a coupler or hitch assembly of the latch type. Angled jaws on the coupler act together with the ramps or angled arms on the equipment secured by the coupler to forgive vertical or horizontal misalignment during the coupling operation. The assembly has an automatically engaging latch plate which is held in a closed position by a lock pin holding mechanism with a lock pin. The lock pin holding mechanism also provides frictional restraint for holding the plate in an open position. The lock pin holding mechanism allows relatively unresisted movement of the latch plate from an open to a closed position. Movement of the latch plate is also controlled by a limit tab on the coupler to prevent the lock pin from interfering with the coupler operation. Although this system utilizes a latch type coupler, it is designed and functionable in a manner which is not conducive for typical heavy industrial quick coupling. For example, the coupler assembly requires that a pair of latch plate members with various components be spaced across the width of the work machine in order to operate in coupling an implement. Further, the latch plate members are disposed at an outer surface of a mounting bracket which makes them vulnerable to greater wear and possible damage which may reduce the functionability of the coupler assembly. Even further, there is no automatic means for forcing the latch plate members to the coupling position during decoupling.

The present invention is directed to overcoming the problems as set forth above.

DISCLOSURE OF THE INVENTION

In an aspect of the present invention, a coupler assembly is disclosed which selectively couples a work implement with first and second coupling pins to a work machine with a structural arm and a linkage. The coupler assembly includes a pair of plates which are interconnected by a shaft to define a receiver with connecting and coupling end portions. First and second connecting pins extend continuously between the pair of plates for attachment to said respective structural arm and linkage. The connecting end portion defines a first outwardly open coupling pin receiving notch adapted for receiving said first coupling pin of the work implement. The coupling end portion defines a second outwardly open coupling pin receiving notch adapted for receiving said second pin of the work implement. A mounting opening extends through each of said pair of plates in the coupling end portion of the receiver. A cylindrical catcher has a bore therethrough and is rotational mounted between the pair of plates at the coupler end portion of the receiver. The catcher is movable between an open and closed position. The catcher has a latch notch along its length at a first location and an actuating notch along its length thereof at a second location substantially opposed to the first location. The actuating notch is proximate the second receiving notch. The actuating notch includes an open jaw and a cam surface engageable by the second coupling pin for rotating the catcher counterclockwise relative to the second receiving notch to the closed position wherein the jaw partially obstructs the second receiving notch. A resilient lock assembly is mounted on each of the pair of plates at the coupler end portion. The lock assembly has a latch member which is slidably supported within each of the mounting openings for movement between a retracted position and an extended position. The lock assembly further has a bias member which biases the latch member toward the extended position. The latch member is forced to the retracted position when the catcher is in said open position and is biased to the extended position when the catcher is in the closed position. The biasing to the extended position of the latch member slidably engages the latch member with the latch notch which locks the catcher in the closed position and retains the second coupling pin within the second receiving notch by the obstruction of the jaw.

The present invention includes a coupler assembly mounted on a work machine. The coupler assembly includes a cylindrical catcher rotatably mounted between a pair of plates. During coupling, the catcher is rotated at a cam surface by an implement coupling pin which allows a lock member mounted to the pair of plates to slidingly engage automatically with the catcher for locking the catcher in a closed position. The closed position establishes that a jaw of the catcher is located in a position which retains the implement coupling pin within a receiving notch of the catcher thereby coupling the implement to the work machine. The ability to couple an implement to a work machine with ease and simplicity in conjunction with the utilization of durable components, increases usability and reliability while reducing costs.

BRIEF DESCRIPTION OF THE DRAWINGS

FIG. 6 is a diagrammatic side elevational view illustrating a closed position of the catcher thereof subsequent to coupling the implement.

BEST MODE FOR CARRYING OUT THE INVENTION

Figure 1:
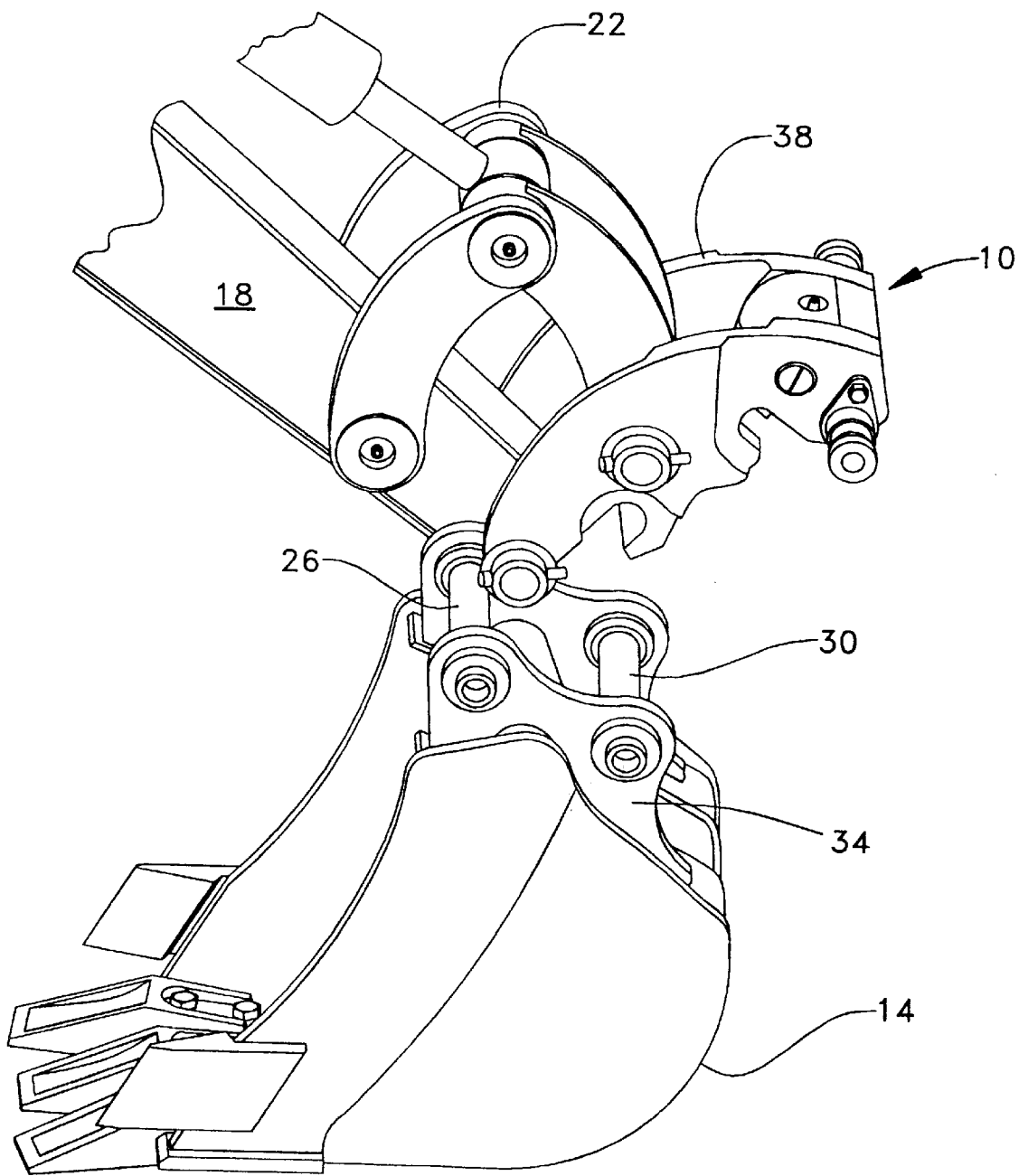
FIG. 1 is a partial perspective view of an implement coupled to a work machine by utilization of the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

A quick coupler assembly 10 is shown in FIG. 1 for selectively coupling a work implement 14, such as a bucket, to and from a structural arm assembly 18 and linkage 22 of a work machine (not shown). The work implement 14 has a pair of coupling pins 26,30 which extend substantially across an outer portion 34 of the implement 14 in a well-known manner.

Figure 2:
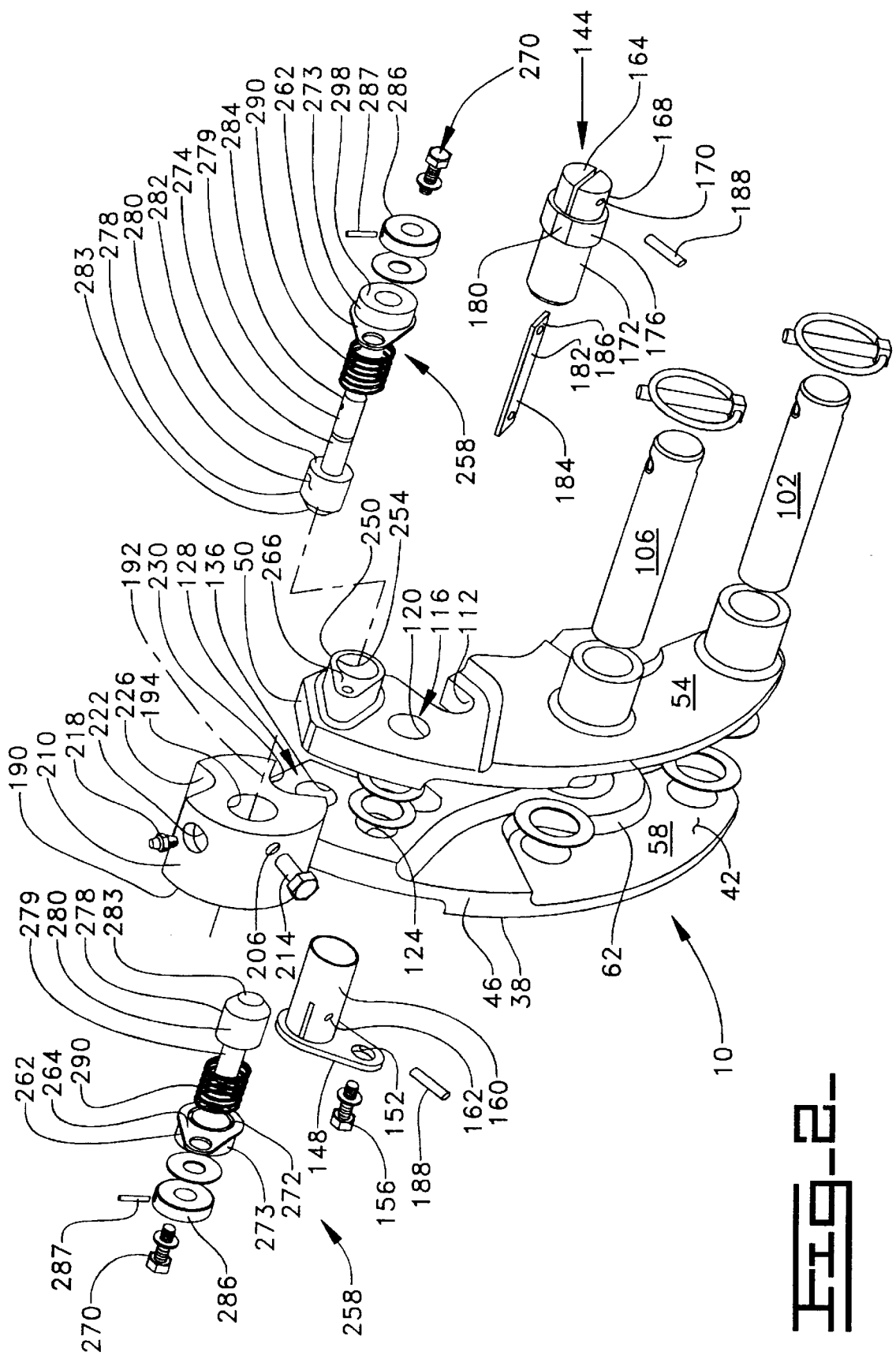
FIG. 2 is an diagrammatic exploded perspective view of the present invention.
Figure 3:
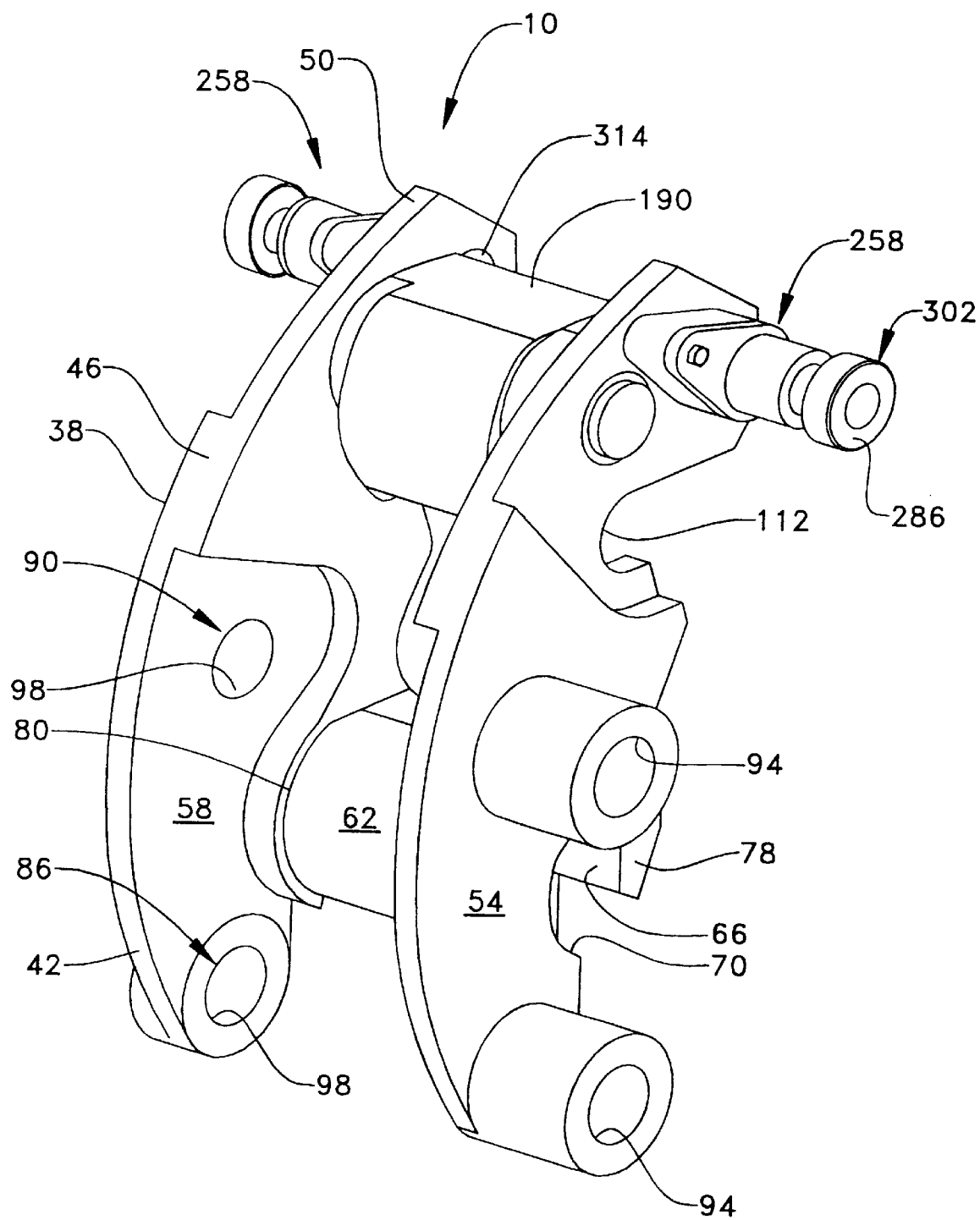
FIG. 3 is a diagrammatic perspective view of the present invention illustrating a disengaged position of a lock assembly thereof.
Figure 4:
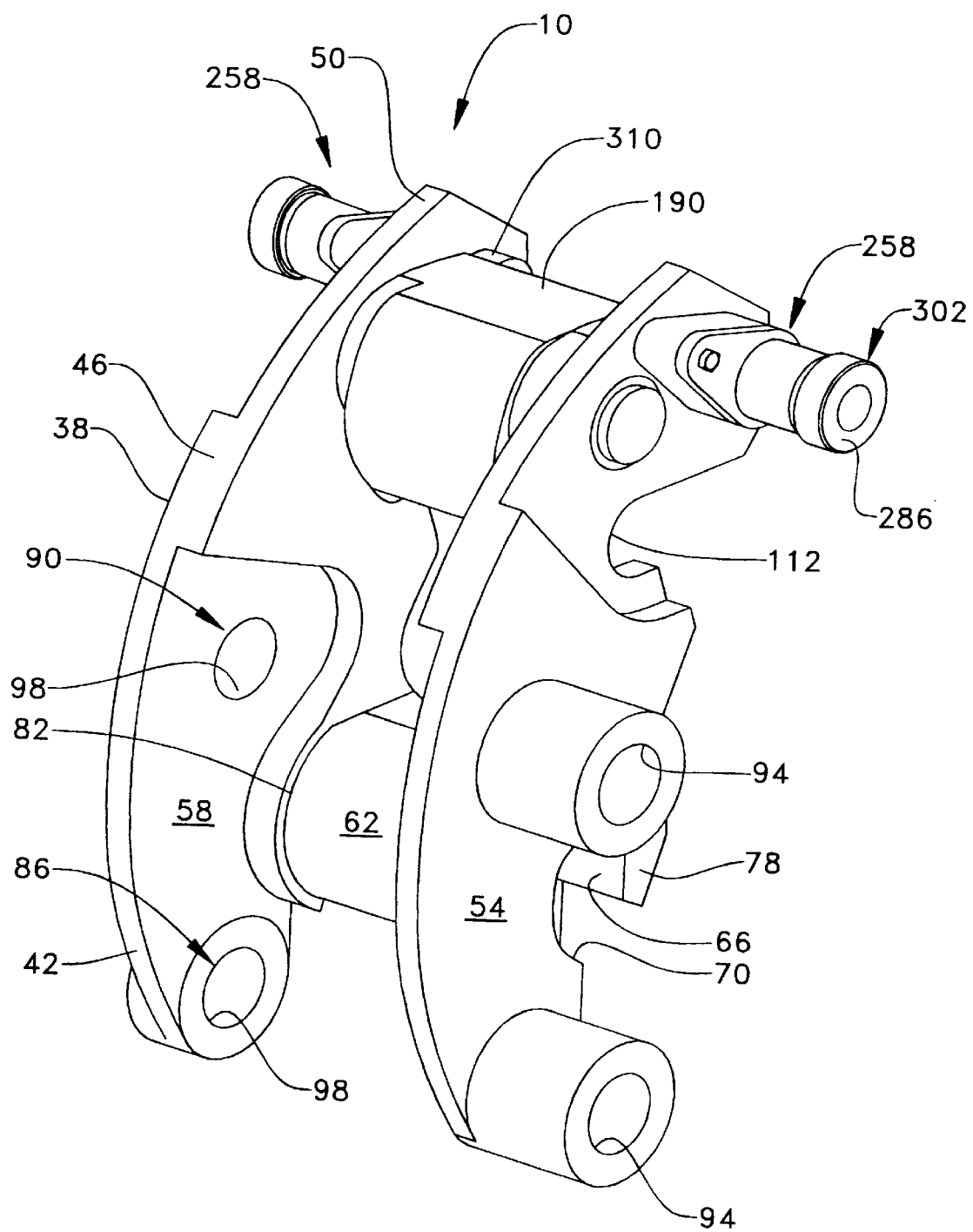
FIG. 4 is a diagrammatic perspective view of the present invention illustrating an engaged position of the lock assembly thereof.

As can be seen more clearly in FIGS. 2–4, the coupler assembly 10 includes a receiver 38 with a connecting end portion 42, an intermediate portion 46, and a coupling end portion 50 opposite the connecting end portion 42. The receiver is defined by a pair of spaced plates 54,58 which are interconnected through a shaft 62 therebetween. The pair of plates 54,58 are formed to define a width therebetween at the intermediate portion which is less than the width at the connecting end portion 42 and greater than the width at the coupling end portion 50. The shaft 62 includes an outwardly open coupling pin receiving notch 66 formed therein which extends along its length. Each of the pair of plates 54,58 includes a notch, one of which is shown at 70, formed at the connecting end portion 42 adjacent to a respective first and second end portion 78, 82 of the shaft 62 to further define the coupling pin receiving notch 66. The connecting end portion 42 of the receiver 38 includes a pair of pin mounting openings 86,90 defined by a pair of coaxially aligned openings 94,98 disposed through each of the pair of plates 54,58. First and second connecting pins 102,106 are each mounted in a well-known manner within one of the respective pairs of pin mounting openings 86,90 and extend entirely between the pair of plates 54,58. The pair of plates 54,58 define an outwardly open coupling pin receiving notch 112 formed within each of the pair of plates 54,58 at the coupling end portion 50. The coupling pin receiving notch 66 at the connecting end portion 42 is disposed at an angular relationship to the coupling pin receiving notch 112 at the coupling end portion 50. The coupling end portion 50 of the receiver 38 includes a catcher mounting opening 116 defined by a pair of coaxially aligned openings 120,124 disposed through each of the pair of plates 54,58 proximate the coupling pin receiving notch 112. The coupling end portion 50 of the receiver 38 includes a lock mounting opening 128 defined by a pair of coaxially aligned openings, one of which is shown at 136, disposed through each of the pair of plates 54,58 proximate the catcher mounting opening 116.

A pin assembly 144 is disposed within the catcher mounting opening 116 and includes a mounting plate 148 with an opening 152 therethrough. The mounting plate 148 is fixedly connected to one of the pair of plates 58 by a bolt assembly 156 which extends through the opening 152. A tubular housing 160 is rigidly connected to the mounting plate 148 for extention through the opening 124 and includes an opening therethrough 162. A substantially cylindrical housing 164 has a mounting end portion 168 mounted for rotation within the opening 120 and includes an opening 170 therethrough. The cylindrical housing 164 includes a supporting end portion 172 opposite the mounting end portion 168 which is slidingly disposed within the tubular housing 160 and an intermediate portion 176 with a diameter larger than either the mounting end portion 168 or the supporting end portion 172 and having a flat 180 thereon. A resilient plate 182 is connected to the tubular housing 160 at a first end 184 and extends transversely from the mounting plate 148 to connect with the cylindrical housing 164 at a second end 186 through a pair of pins 188 extending through respective openings 162,170.

A catcher 190 with a central axis 192 is rotatably mounted between the pair of plates 54,58. The catcher 190 has an offset center bore 194 which is substantially parallel to the central axis 192 through which the housing 164 of the pin assembly 144 extends for movement between open and closed positions 198,202, as seen more clearly in FIGS. 5 and 6. It should be understood that the bore 194 could be located along the central axis 192 and still remain within the scope of the invention. A threaded cross bore 206 extends from an outer surface 210 of the catcher 190 to transversely intersect with the bore 194. A bolt 214 extends through the cross bore 206 to seat against the flat 180 on the intermediate portion 176 of the housing 164. A grease fitting 218 is disposed in a well-known manner within a port opening 222 which intersects the bore 194 to provide lubricating fluid from an external source (not shown) to a pin joint defined between the housing 164 and the catcher 190. The catcher 190 defines a latch notch 226 and actuating notch 230 which extend at different location along the length of the catcher 190. The actuating notch 230 is located in close proximity to further define the coupling pin receiving notch 112 of the coupling end portion 50 and includes an open jaw 234 and a cam surface 238 substantially opposing the open jaw 234.

A mounting structure 250 is fixedly connected at each of the pair of coaxially aligned openings 132,136 which define the lock mounting opening 128. The mounting structures 250 each include a mounting bore 254 therethrough coaxially aligned with a respective one of the pair of aligned openings 132,136. A resilient lock assembly 258 is fixedly mounted to each of the mounting structures 250 and includes a mounting flange 262 seated at a bottom surface 264 against a top surface 266 of the mounting structure 250 and connected thereto by a bolt assembly 270 in a well-known manner. A spring seating region 272 is created at the juncture between the bottom surface 264 of the mounting flange 262 and a boss 273. The boss 273 is rigidly connected to the mounting flange 262 and extends through a bore therethrough. Each of the resilient lock assemblies 258 includes a latch member 274 with opposed latching and controlling end portions 278,279. The latching end portion 278 includes a latch 280 with a planar rear end portion 282 and a bullet shaped head end portion 283. The controlling end portion 279 has a smaller diameter than the latch 280 and is slidingly disposed within the bore of the mounting flange 262. The controlling end portion 279 extends through a central bore in the boss 273 and a predetermined distance beyond the boss 273 to define a distal connecting end 284. The controlling end portion 279 includes a circumferential groove 285 therearound. The rear end portion 282 of the latch 280 is spaced proximate from the bottom surface 264 of the mounting flange 262. A control knob 286 has a bore which circumferentially surrounds the distal end 284 of the controlling end portion 279. The control knob 286 is connected in any suitable manner to the latch member 274, such as through a pin 287 as seen in FIG. 2. A spring 290 circumferentially surrounds the controlling end portion 279 and is seated at one end within the spring seating region 272 against the bottom surface 264 of the mounting flange 262 and against the rear planar surface 282 of the latch 280 at an opposite end. The control knob 286 is spaced from a top surface 298 of the boss 273 at an unlocked position 302 and is seated against the top surface 298 of the boss 273 at a locked position 306. The latch 280 is movable between an extended position 310 between the plates 54,58 and a retracted position 314 within the mounting structure 250. A washer 316 is positioned between the control knob 286 and top surface 298 of the boss 273 for sliding movement along the diameter of the controlling end 279 of the latching member 274.

INDUSTRIAL APPLICABILITY

The coupling assembly 10 is connected to the work machine (not shown) by attaching the arm assembly 18 and linkage 22 to the respective coupling pins 102, 106 so that the bucket 14 may be quickly coupled for operation with the work machine (not shown).

Figure 5:
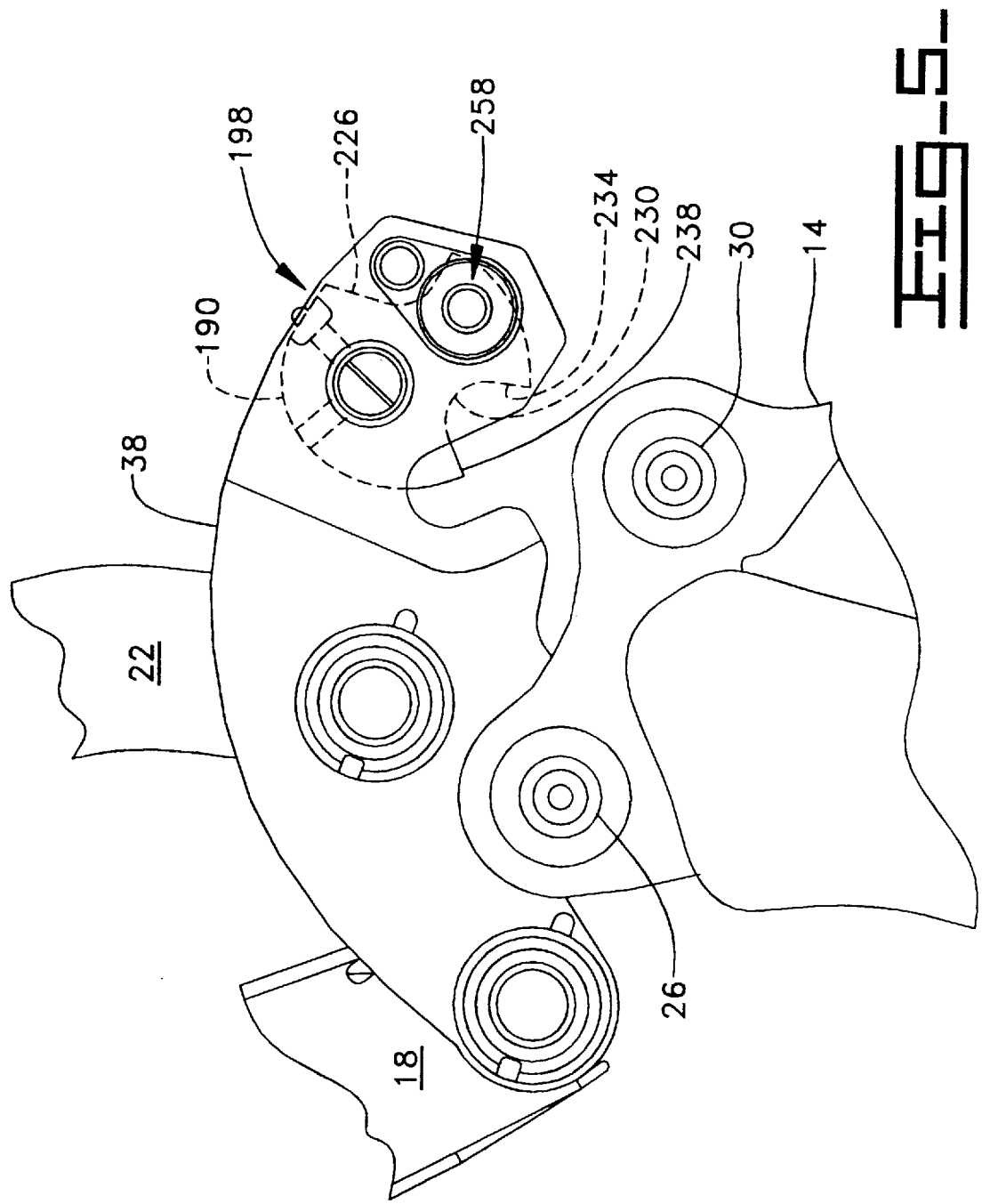
FIG. 5 is diagrammatic side elevational view illustrating an open position of a catcher thereof prior to coupling the implement.

During coupling of the bucket 14 to the coupler assembly 10, the coupling pin receiving notch 66 of the receiver 38 receives the coupling pin 26 of the bucket 14. As seen in FIG. 5, prior to the coupling pin receiving notch 112 receiving the coupling pin 30 of the bucket 14, the catcher 190 is positioned in the open position 198. The catcher 190 abuts with the head end portion 283 of the latch 280 which forces the latch 280 to the retracted position 314. Simultaneously, the position of the spring 290 biases the latch 280 toward the extended position 310 exerting pressure against the catcher 190. As seen in FIG. 6, the coupling pin 30 of the bucket 14 is received by the coupling pin receiving notch 112. Simultaneously, the coupling pin 30 is brought into engagement with the cam surface 238 of the catcher 190 which rotates it clockwise toward the closed position 202. The rotation of the catcher 190 causes the intermediate portion 176 of the pin assembly 144 to rotate responsively due to the connection therebetween achieved by the bolt 214. The rotation of the intermediate portion 176 forces the resilient plate 182 to twist about the pins 188. The closed position 202 of the catcher 190 axially aligns the latch notch 226 and the latch member 274 so that the spring 290 automatically biases the latch 280 toward the extended position 310. The extension of the latch 280 within the latch notch 226 locks the catcher 190 in the closed position 202 and moves the control knob 286 to the locked position 306. The movement of the catcher 190 to the closed position 202 moves the jaw 234 to a position which obstructs the coupling pin receiving notch 112 and retains the coupling pin 30 therein, thereby completing the coupling process.

Removal of the bucket 14 from the coupler assembly 10 requires an operator (not shown) to position the bucket 14 slightly above the ground so that the coupler assembly 10 is also elevated accordingly. The operator (not shown) then pulls the control knob 286 outwardly toward the unlocked position 302 against the biasing action of the spring 290. Once the latch 280 is substantially removed from within the latch notch 226, the washer 316 is slid along the controlling end 279 of the latch member 274 until it is received into the circumferential groove 285. The seating of the washer 316 within the groove 285 retains the latch 280 in a predetermined position so that the bullet shaped head end portion 283 remains partially within the latch notch 226. This allows the bullet shaped head end portion 283 to hold the catcher 190 in the closed position 202 and obstruct the catcher 190 from movement to the open position 198 without further operator (not shown) input at the coupler assembly 10. To complete the decoupling operation, the operator (not shown) "racks back" the bucket 14 in a well-known manner through controls within an interior portion of the work machine (not shown) so that the weight of the bucket 14 exerts an auxiliary torque on the catcher 190. The auxiliary torque provided by the weight of the bucket 14 pivots the catcher 190, causing it to be forced against the bullet shaped head end portion 283. The bullet shape of the head end portion 283 is suitable to permit the pivoting catcher 190 to act progressively thereagainst to move the latch 280 against the biasing action of the spring 290. Once the latch 280 is forced completely within the mounting structure 250 by the catcher 190, any obstruction of movement for the catcher 190 is removed. Therefore, the resilient plate 182 is free to untwist and resume its original shape which forces the catcher 190 to the open position 198. It should be understood that the catcher 190 may be biased to the open position 198 in any suitable manner to achieve the same result. The open position 198 of the catcher 190 holds the latch 280 in the retracted position 314 and moves the jaw 234 from the coupling pin receiving notch 112 allowing the coupling pin 30 to be expelled, thus, decoupling the bucket 14. The coupling process would be repeated, as initially described, to couple one of a number of various implements to the coupler assembly 10 for operation with the work machine (not shown).

Other aspects, objects and advantages of this invention can be obtained from a study of the drawings, disclosure and the appended claims.

What is claimed is:

1. A coupler assembly for selectively coupling a work implement having first and second coupling pins to a work machine having a structural arm and a linkage, comprising:

a pair of plates interconnected by a shaft to define a receiver with connecting and coupling end portions and having first and second connecting pins extending continuously between said pair of plates for attachment to said respective structural arm and linkage, said connecting end portion defining a first outwardly open coupling pin receiving notch adapted for receiving said first coupling pin of the work implement, said coupling end portion defining a second outwardly open coupling pin receiving notch adapted for receiving said second pin of the work implement and having a mounting opening extending through each of said pair of plates;

a cylindrical catcher having a bore therethrough for rotational mounting between said pair of plates at said coupling end portion of the receiver and movable between an open and closed position, said catcher having a latch notch along the length thereof at a first location and an actuating notch along the length thereof at a second location substantially opposed to said first location, said actuating notch proximate said second receiving notch and having an open jaw and a cam surface engageable by said second coupling pin to define an engagement force thereagainst for rotating said catcher counterclockwise relative to said second receiving notch to said closed position wherein said jaw partially obstructs said second receiving notch;

a resilient lock assembly mounted on each of said pair of plates at said coupling end portion and having a latch member slidably supported within each of said mounting openings for movement between a retracted position and an extended position and a bias member biasing said latch member toward said extended position, said latch member being forced to the retracted position through contact with an outer, planar surface of the catcher when said catcher is in said open position and being biased to the extended position when said catcher is in said closed position and the outer, planar surface of the catcher is out of contact with the latch member for slidable engagement with said latch notch wherein said catcher is locked in the closed position and said second coupling pin is retained within said second receiving notch through the obstruction of said jaw; and a means for moving said latch member from said extended position to said retracted position, said moving means including a first control for moving said latch member a predetermined distance toward said retracted position and a second control for completing the movement of said latch member to said retracted position.

2. The coupler assembly of claim 1, including a pin assembly fixedly mounted for pivotal movement and extending through the bore of said catcher, said pin assembly including means for forcing said catcher from said closed position toward said open position when said latch member is moved from said extended position to said retracted position.

3. The coupler assembly of claim 2, wherein said catcher has a central axis and said bore extends substantially parallel to said central axis and is offset a predetermined distance therefrom.

4. The coupler assembly of claim 2, wherein said catcher has a central axis and said bore extends substantially therealong.

5. The coupler assembly of claim 2, wherein said pin assembly includes a mounting plate fixedly connected to one of said pair of plates and a housing rotatably mounted to said mounting plate, said forcing means including a resilient plate member disposed within said housing and being fixedly attached at a first end to said mounting plate and attached at a second end with said housing for rotation therewith when said catcher is moved from said open position to said closed position and for forcing said catcher toward said open position when said latch member is moved from said extended position to said retracted position by said control.

6. The coupler assembly of claim 1, wherein said first outwardly open coupling pin receiving notch is integrally formed on said shaft and said second outwardly open coupling pin receiving notch is integrally formed on said pair of plates.

7. The coupler assembly of claim 1, wherein said latch member has first and second end portions and said first control contacts said first end portion and said second control contacts said second end portion.

8. The coupler assembly of claim 7, wherein contact with said first end portion includes pulling said latch member and contact with said second end portion includes pushing said latch member.

9. The coupler assembly of claim 7, wherein movement of said latch member the predetermined distance and the shape of said second end portion thereof permits said catcher to act as said second control for moving said latch member to said retracted position when a force is applied to said catcher.

10. The coupler assembly of claim 9, wherein when said latch member is moved said predetermined distance said catcher remains in the closed position until said force is applied.

* * * * *